United States Patent
Hendricks

(10) Patent No.: US 11,325,660 B2
(45) Date of Patent: May 10, 2022

(54) SAFETY SUPPORT APPARATUS

(71) Applicant: James Hendricks, Virden, IL (US)

(72) Inventor: James Hendricks, Virden, IL (US)

(*) Notice: Subject to any disclaimer, the term of this patent is extended or adjusted under 35 U.S.C. 154(b) by 0 days.

(21) Appl. No.: 16/959,660

(22) PCT Filed: Dec. 28, 2018

(86) PCT No.: PCT/US2018/067929
§ 371 (c)(1),
(2) Date: Jul. 1, 2020

(87) PCT Pub. No.: WO2019/135999
PCT Pub. Date: Jul. 11, 2019

(65) Prior Publication Data
US 2021/0078648 A1 Mar. 18, 2021

Related U.S. Application Data

(60) Provisional application No. 62/613,672, filed on Jan. 4, 2018.

(51) Int. Cl.
*B62D 33/07* (2006.01)
*B62D 49/00* (2006.01)

(52) U.S. Cl.
CPC ........... *B62D 33/07* (2013.01); *B62D 49/005* (2013.01)

(58) Field of Classification Search
CPC .. B62D 33/063; B62D 33/067; B62D 49/005; B62D 53/06; B62D 49/08; B62D 49/02; F16M 13/00; F16M 11/00; B66C 23/78; B60C 59/22

USPC .............................................. 280/763.1, 764.1
See application file for complete search history.

(56) References Cited

U.S. PATENT DOCUMENTS

| | | | | |
|---|---|---|---|---|
| 2,082,139 | A * | 6/1937 | Bassetti | B60P 1/283 248/351 |
| 2,447,097 | A * | 8/1948 | Silver | B62D 49/08 280/449 |
| 5,918,698 | A * | 7/1999 | Lunn | E06C 7/423 182/107 |
| 6,053,284 | A * | 4/2000 | Fountain | E06C 7/42 182/180.2 |
| 7,624,844 | B2 * | 12/2009 | Alexander | E06C 7/02 182/127 |
| 8,245,997 | B2 * | 8/2012 | Baratta | B25H 1/0064 248/676 |
| 8,424,643 | B1 * | 4/2013 | Speaks | B63B 17/00 182/180.3 |

(Continued)

FOREIGN PATENT DOCUMENTS

WO WO-9409307 A1 * 4/1994 ......... F16M 11/2021

*Primary Examiner* — Paul N Dickson
*Assistant Examiner* — Caitlin Anne Miller
(74) *Attorney, Agent, or Firm* — Singleton Law Firm, P.C.

(57) ABSTRACT

Embodiments of the present invention provide a safety support apparatus for a cabin over engine (COE) truck cabin elevated in a raised position. The safety support apparatus provides a base member having a clamp mechanism which adjusts to truck chassis designs with rails of varying thicknesses. The frame of the safety support apparatus provides a receiver which may engage the bottom of an elevated truck cabin. The frame and base member are adjustable to allow configuration on either side of a truck cabin and deployment of the support apparatus at a range of angles.

11 Claims, 6 Drawing Sheets

(56) References Cited

U.S. PATENT DOCUMENTS

| | | | |
|---|---|---|---|
| 8,651,450 B2* | 2/2014 | Sollars | E04G 11/08 249/194 |
| 2021/0079950 A1* | 3/2021 | Hendricks | B60P 1/28 |

* cited by examiner

SAFETY SUPPORT APPARATUS

CROSS-REFERENCE TO RELATED APPLICATIONS

This application claims the benefit of U.S. Provisional Application No. 62/614,715, filed Jan. 4, 2018.

BACKGROUND OF THE INVENTION

In transportation, cab over engine (COE) trucks are used to transport materials, where the truck cabin may be pivotably hinged at the front and raiseable by powered drives at the rear. In operation, a truck cabin may be placed in a raised configuration for a prolonged period of time to grant service personnel physical clearance to access mechanisms on the underside of the truck cabin, such as the engines. The elevation of a truck cabin for a protracted length of time poses safety complications for personnel at work under the truck cabin, due to the risk of accidental release of the truck cabin from an elevated position. A structural support may be imposed beneath an elevated truck cabin to reduce the risk of accidental release. However, the structural support itself must be secured to prevent the support from accidental slippage or dislocation.

A safety support device does not exist to reinforce the underside of a COE truck cabin securely to the truck chassis frame while addressing the risk of dislodgment.

DETAILED DESCRIPTION OF THE INVENTION

Embodiments of the present invention provide a safety support apparatus for a cabin over engine (COE) truck having a cabin in an elevated position. The safety support apparatus comprises a frame and a base. The base of the safety support apparatus may be modular to allow attachment of the frame to a truck chassis frame in a forward or reverse orientation. The base of the safety support apparatus further comprises an adjustable clamping mechanism configured to accommodate truck chassis designs and frame rails of varying thicknesses. The top of the main body of the safety support apparatus further comprises a receiver which may be configurable to pivot through a range of angles to adjust to an angle of the elevated truck cabin.

Figure 1:
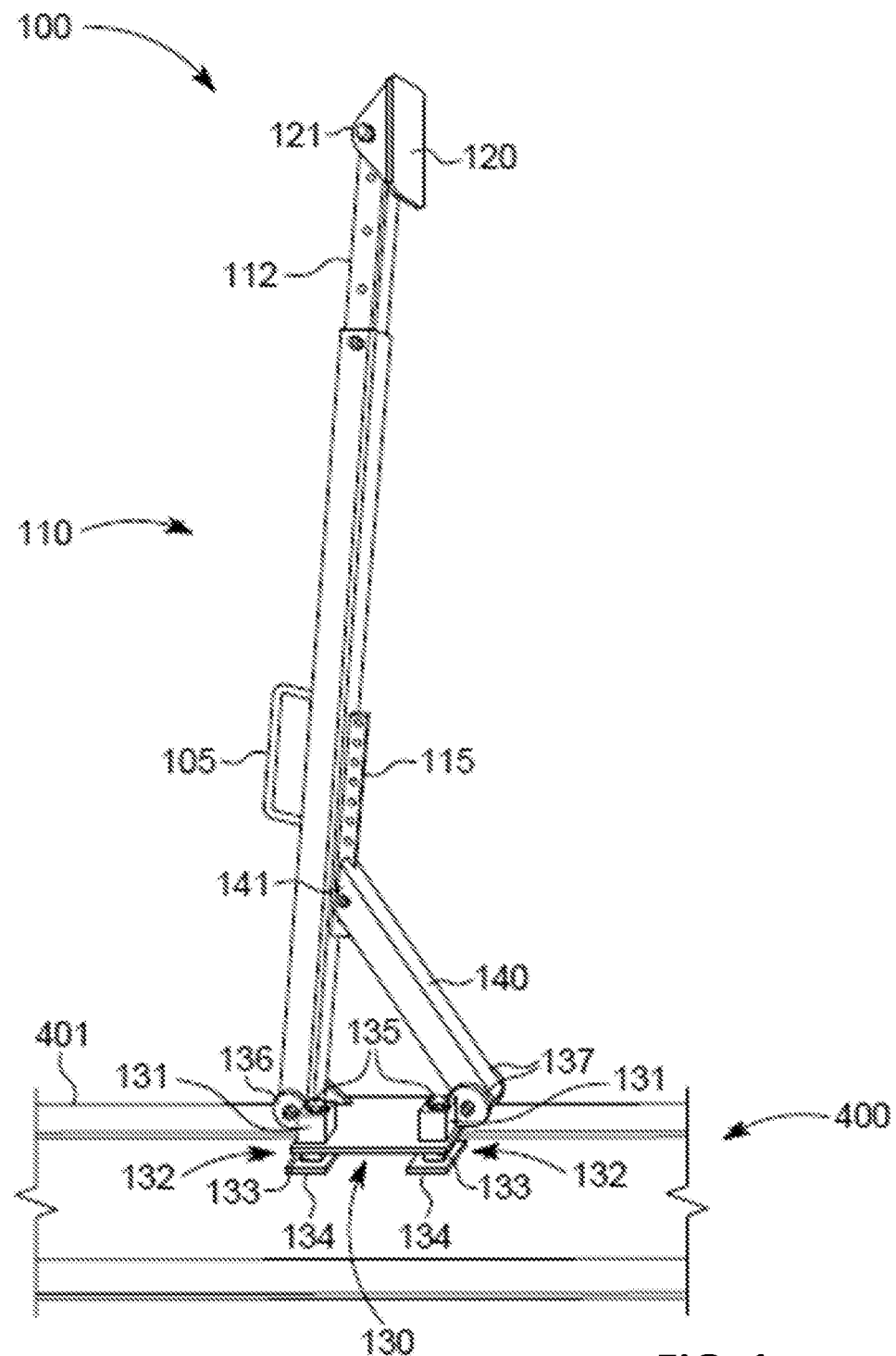
FIG. 1 illustrates a perspective view of a safety support apparatus according to an embodiment of the present invention.

FIG. 1 presents a support apparatus 100 having a frame 110 having at least one handle 105 on an anterior side of the frame 110 and a variable attachment member 115 on a posterior side of the frame 110. The frame 110 may further comprise lateral sides orthogonal to the anterior side and the posterior side. A telescoping member 112 extends through an open top end of the frame 110 and may be coupled thereto; the telescoping member having a top end and a bottom end. The telescoping member 112 may extend and retract from the top end of the frame 110 through a range of lengths. The extruding length of the telescoping member 112 out from the top end of the frame 110 may be fixed by removably inserting and coupling a locking member through the frame 110 and the telescoping member 112.

Figure 2A:
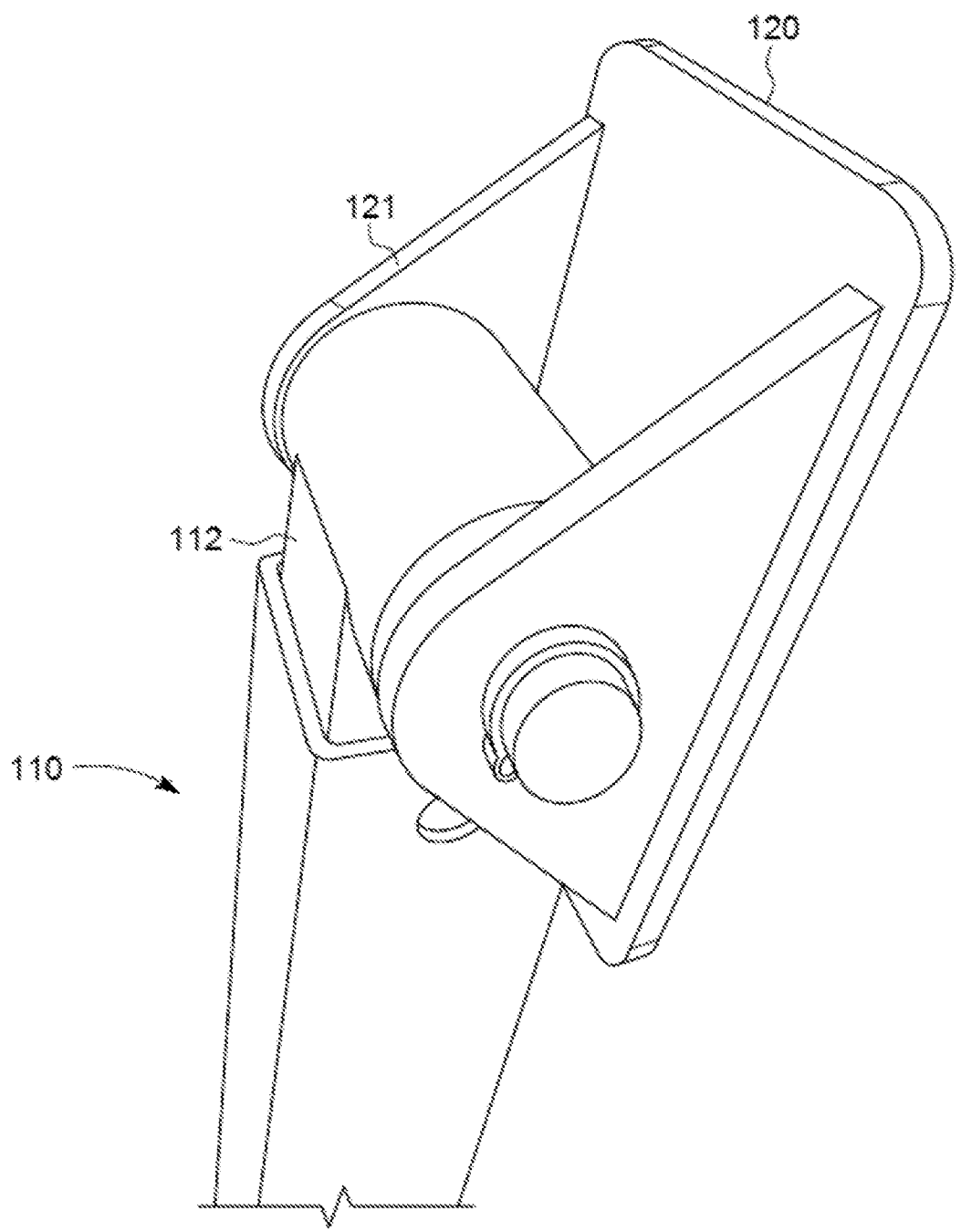
FIG. 2A illustrates a perspective view of a receiver of the safety support apparatus.

A receiver 120 as illustrated in FIG. 2A has a top face, a bottom face, and has brackets 121 configured to pivotably couple the top end of the telescoping member 112 through the brackets 121, such that the top face of the receiver 120 may pivot towards the anterior side of the frame 110, towards the posterior side of the frame 110, or through a range of positions in between. The brackets 121 may each comprise a structure spanning the length of a side of the top face of the receiver 120. Further, a pivot stop (not shown) may be coupled to the bottom face of the receiver and configured to limit pivoting of the top face of the receiver.

A variable attachment member 115 may be coupled to a side of the frame and configured to provide a range of attachment points at which a prop member 140 may be coupled to the frame 110. The prop member 140 comprises an elongate member having an attachment counterpart 141 at an upper end of the prop member 140 and configured to couple the variable attachment member 115. The prop member 140 may be configured with a breadth and cross-section similar to the frame 110. The attachment counterpart 141 may further comprise an elongate bracket, shown in FIG. 3, configured to couple and retain the prop member to the variable attachment member 115. Further, the attachment counterpart 141 may be removably attached to any of the attachment points of the variable attachment member 115. The attachment counterpart 141 may comprise an attachment mechanism having a bolt and nut fastener, a pin fastener, or a pressure fastener.

Figure 2B:
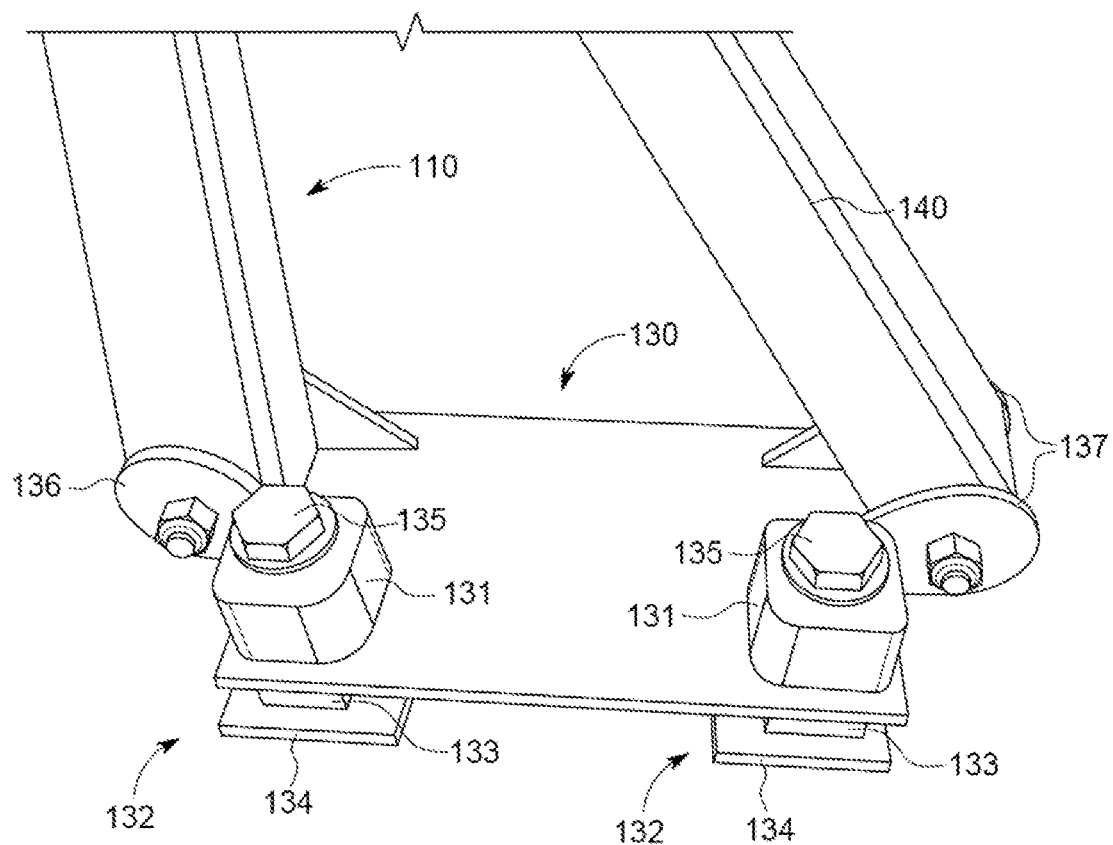
FIG. 2B illustrates a perspective view of a base member of the safety support apparatus.

In some embodiments of the invention, the safety support apparatus may further comprise one or more clamp housings 131 disposed along a lateral surface the base member 130 as illustrated in FIG. 2B. Each of the at least one clamp housing 131 comprises a top, a bottom, at least one side, and a lengthwise passage disposed through the at least one clamp housing 131, the passage accessible at its top through a fastener receiver disposed upon the top of the at least one clamp housing 131 and at the bottom of the at least clamp housing 131 through an opening through the base member 130. A clamp counterpart 132 may be imposed through the passage of the at least one clamp housing 131 by insertion through the opening through the base member 130. Conversely, a clamp counterpart 132 may be removed from the passage of the at least one clamp housing 131 through the opening through the base member 130.

A clamp counterpart 132 comprises a sliding member 133 capable of upward and downward movement through a range of positions within the at least one clamp housing 131, and a clamp jaw plate 134 coupled to a bottom end of the sliding member 133, where the clamp jaw plate 134 halts the upward movement of the sliding member 133 within the at least one clamp housing 131. While the sliding member 133 is disposed within the clamp housing 131, an adjustable fastener 135 may be coupled through the top opening of the at least one clamp housing 131 to the clamp counterpart 132. The adjustable fastener 135 may be affixed at a range of positions in order to move the sliding member 133 through a range of positions within the clamp housing 131, thereby opening the clamp jaw plate 134 and provide a variable clearance between the base member 130 and the clamp jaw plate 134.

Figure 3:
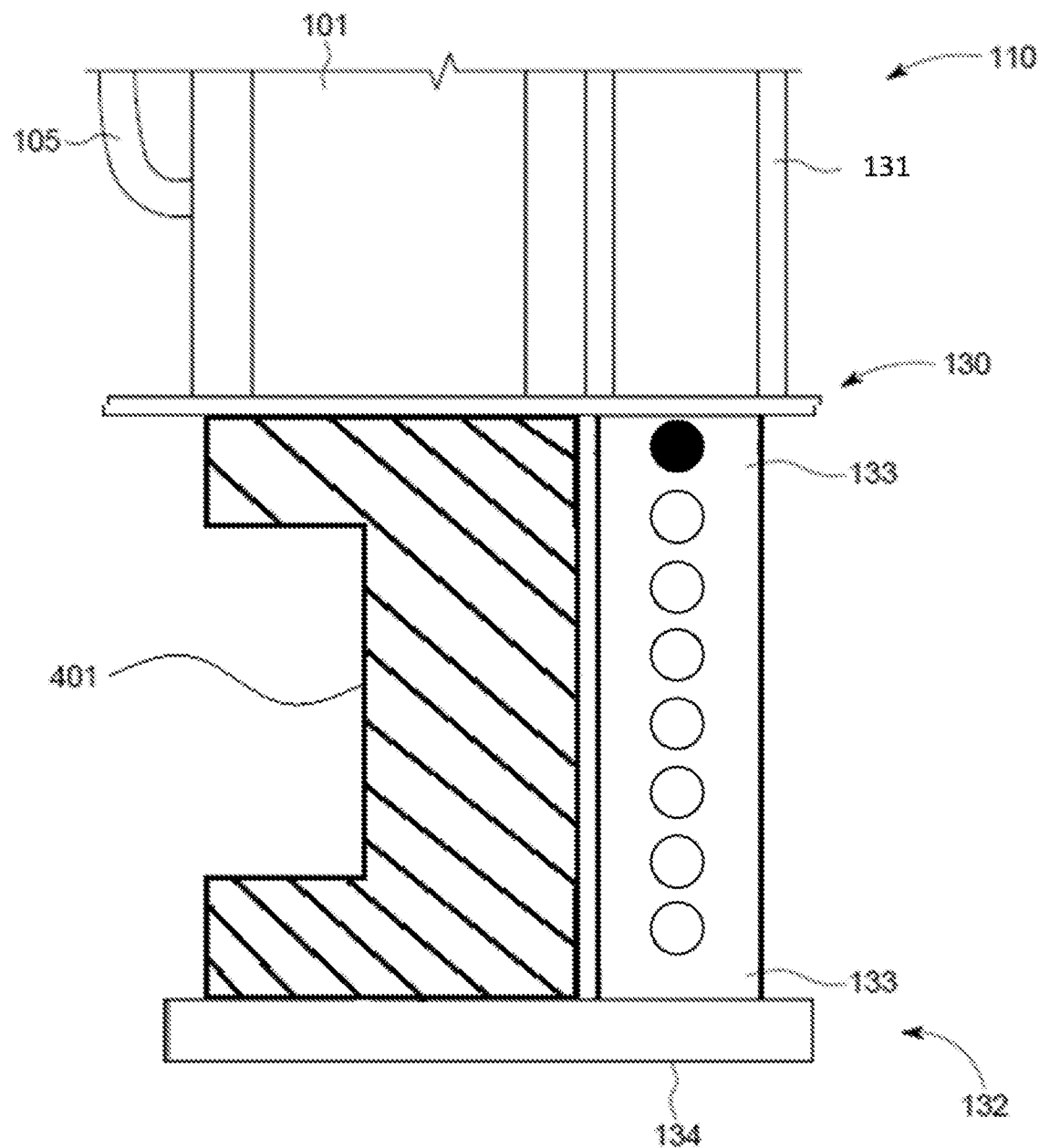
FIG. 3 illustrates a cross-section view of the safety support apparatus with extension insert coupled to a truck chassis frame.

In another embodiment of the invention, shown in FIG. 3, the sliding member 133 may further comprise an elongated member configured to lengthen the support apparatus 100 and enable fastening of the apparatus to a lengthwise rail of a truck chassis having a greater thickness, thereby increasing overall stability and adaptability of the support apparatus when used with various types of truck designs. In another embodiment of the invention, the apparatus 100 may further comprise an extension insert (not shown), configured to couple both the base member 130 and the sliding member 133. The extension insert may further comprise a plurality of notches configured to allow adjustment of an overall clamping area of the apparatus 100 by removably coupling the sliding member 133 at a plurality of adjustment points disposed through at least one surface thereof.

In another embodiment of the invention, at a first end of the base member 130, a first base receiver 136 opens upward from the base member 130, and at a second end of the base member 130, a second base receiver 137 opens upward from the base member 130. The first base receiver 136 and the second base receiver 137 may each receive either a foot of the frame 110 or a foot of the prop member 140. The foot of the frame 110 and the foot of the prop member 140 may each terminate in a receiver counterpart of similar width such that the foot of the frame 110 and the foot of the prop member 140 may be interchangeably inserted within either the first base receiver 136 or the second base receiver 137. The foot of the frame 110 and the foot of the prop member 140 may each be removably fastened to either the first base receiver 136 or the second base receiver 137.

Thus, the frame 110, having the prop member 140 attached to the variable attachment member 115, may be mounted to the base member 130 with the clamp housings 131 to either one lateral side or to the other lateral side of the frame 110. Depending on which attachment point of the variable attachment member 115 the prop member 140 is coupled, the frame 110 may be supported standing at an angle over a range of possible angles.

In operation, a support apparatus 100 may be engaged, as follows, with a lengthwise rail 401 of a COE truck chassis 400 having a cabin 410, where the cabin 410 is pivoted in the raised position.

A support apparatus 100 may be configured for operation, first by manipulating the adjustable fastener 135 to open the clamp jaw plate 134. The receiver 120 may be pivotably fastened to the top of the telescoping member 112 through the brackets 121.

The base member 130 may be coupled to a lengthwise rail 401 of a truck chassis frame 400, with the at least one clamp housing 131 facing outward on either rail so as to be accessible safely while standing to a side of the truck chassis 400, rather than from under the elevated cabin 410. Consequently, the first base receiver 136 may be nearer a head of the truck and the second base receiver 133 nearer a tail of the truck, or the second base receiver 137 may be nearer the head of the truck and the first base receiver 132 nearer the tail of the truck. The clamp jaw plate 134 may be imposed under the lengthwise rail 401 such that the lengthwise rail 401 is situated between the base member 130 and the clamp jaw plate 134.

Figure 4:
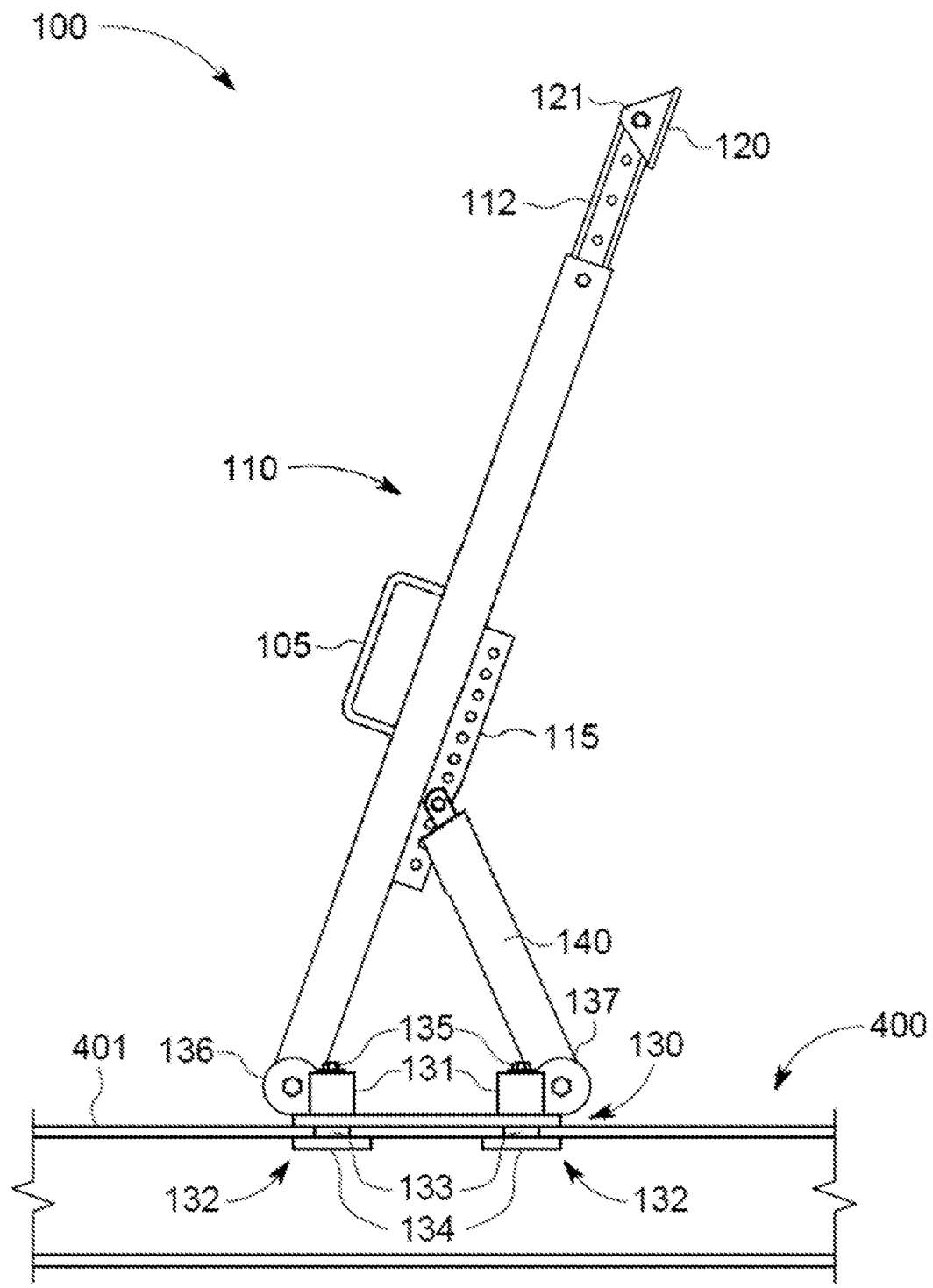
FIG. 4 illustrates a profile view of the safety support apparatus coupled to a truck chassis frame.

The support apparatus 100 may be carried by the at least one handle 105 and oriented with the anterior side facing the head of the truck and the posterior side facing the tail of the truck. The foot of the prop 140 is removably fastened to whichever of the first base receiver 136 and the second base receiver 137 is nearer the head of the truck. The foot of the frame 110 is removably fastened to whichever of the first base receiver 136 and the second base receiver 137 is nearer the tail of the truck. The support apparatus 100 may be moved laterally along the lengthwise rail 401 as illustrated in FIG. 4 until the receiver 120 is in contact with the bottom of the cabin 410.

Figure 5:
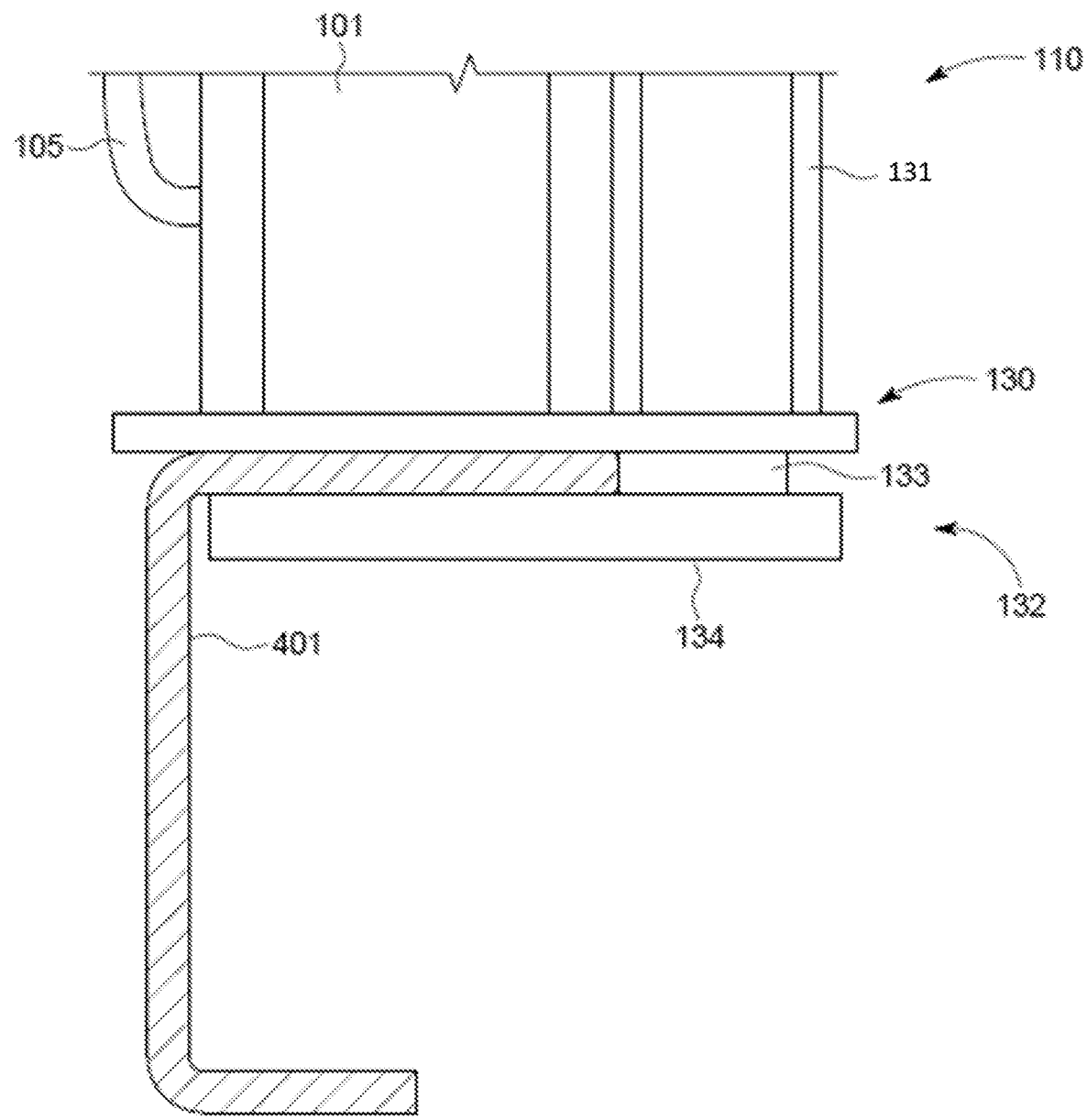
FIG. 5 illustrates a cross-sectional view of the safety support apparatus of FIG. 1 configured in operation with a truck chassis.

The adjustable fastener 135 may be adjusted to close the clamp jaw plate 134 about the lengthwise rail 401 to place the base member 130 and the clamp jaw plate 134 within a locking fit about the lengthwise rail 401, as illustrated in FIG. 5. Such a locking fit may accommodate a range of approximately ¼ to ⅜ of an inch, inclusive.

The above steps may be performed a second time upon a second lengthwise rail 401 of the truck chassis 400 using a second support apparatus 100.

Embodiments of the present invention provide a safety support for raised cabin over engine (COE) truck cabins, with a mechanism for reliably coupling the safety support against the truck chassis without burdensome or unsafe fasteners. The frame of the safety support may be angled over a range of possible angles and locked in place by a prop member. Furthermore, embodiments of the present invention provide multiple modular configurations for a base member that may be engaged on both rails of the truck chassis without the need for two distinct base member components.

While particular elements, embodiments, and applications of the present invention have been shown and described, the invention is not limited thereto because modifications may be made by those skilled in the art, particularly in light of the foregoing teaching. It is therefore contemplated by the application to cover such modifications and incorporate those features which come within the spirit and scope of the invention.

What is claimed is:

1. A support apparatus, comprising:
    a frame having a first end, a second end, at least one side, and a variable attachment member configured with a plurality of attachment points;
    a base member configured to couple to a rail of a truck chassis having a truck cabin positioned over an engine of the truck, having a first base receiver and a second base receiver;
    a prop member having a first end, a second end, and an attachment counterpart configured to couple one of the plurality of attachment points; and
    at least one clamp coupled to the base member;
    wherein the first end of the frame and the first end of the prop member are removably coupled each to one of either the first base receiver or the second base receiver.

2. The support apparatus of claim 1, wherein the frame has an anterior side and a posterior side.

3. The support apparatus of claim 2, wherein at least one of the anterior side and the posterior side further comprises at least one handle.

4. The support apparatus of claim 1, wherein the clamp comprises a clamp housing having a clamp counterpart moveably disposed therethrough, wherein the clamp housing is disposed along a lateral surface of the base member.

5. The support apparatus of claim 4, further comprising an adjustable fastener disposed through the clamp housing and coupled to the clamp counterpart.

6. The support apparatus of claim 5, wherein the clamp counterpart further comprises a sliding member and a clamp jaw plate.

7. The support apparatus of claim 6, wherein the adjustable fastener is configured to move the sliding member through a range of positions within the clamp housing and provide a variable clearance between the base member and the clamp jaw plate.

8. The support apparatus of claim 1, further comprising a telescoping member, with a top end and a bottom end, disposed within and extended from an open top of the frame and a receiver pivotably coupled to the top end of the telescoping member.

9. A method of using a safety support apparatus, comprising the following steps:
 a. placing a base member of the support apparatus upon a rail of a truck chassis having a truck cabin positioned over an engine of the truck;
 b. attaching prop member to at least one of a plurality of attachment points of a variable attachment member of a frame of the safety support apparatus;
 c. attaching an end of the frame to one of a first base receiver and a second base receiver;
 d. attaching an end of the prop member to one of the first base receiver and the second base receiver;
 e. moving the support apparatus laterally along the rail of the truck chassis until a receiver of the safety support apparatus abuts a bottom of the truck cabin; and
 f. adjusting at least one clamp to form a locked coupling about the rail.

10. The method of claim 9, wherein the frame has an anterior side and a posterior side; and wherein the base member is placed upon the rail such that the anterior side faces a head of the truck and the posterior side faces a tail of the truck.

11. The method of claim 9, wherein the clamp comprises a clamp housing having a clamp counterpart moveably disposed therethrough.

\* \* \* \* \*